United States Patent
Venkatesh et al.

(10) Patent No.: US 10,146,499 B2
(45) Date of Patent: Dec. 4, 2018

(54) SYSTEM AND METHOD TO REDIRECT DISPLAY-PORT AUDIO PLAYBACK DEVICES IN A REMOTE DESKTOP PROTOCOL SESSION

(71) Applicant: Dell Products L.P., Round Rock, TX (US)

(72) Inventors: Ramanujam Kaniyar Venkatesh, Bangalore (IN); Elavarasu Krishnan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 473 days.

(21) Appl. No.: 14/879,574

(22) Filed: Oct. 9, 2015

(65) Prior Publication Data

US 2017/0102913 A1 Apr. 13, 2017

(51) Int. Cl.
*G06F 3/16* (2006.01)
*G06F 9/455* (2018.01)

(52) U.S. Cl.
CPC .......... *G06F 3/165* (2013.01); *G06F 9/45558* (2013.01)

(58) Field of Classification Search
CPC ................................ G06F 3/165; G06F 3/167
USPC ........................................................ 715/728
See application file for complete search history.

(56) References Cited

U.S. PATENT DOCUMENTS

| | | | |
|---|---|---|---|
| 8,010,630 B2 | 8/2011 | Barreto et al. | |
| 8,572,754 B2 * | 10/2013 | Raju | G06F 21/575 709/202 |
| 8,667,157 B2 * | 3/2014 | Poe | H04L 67/08 709/217 |
| 8,738,711 B2 * | 5/2014 | Walsh | H04L 67/02 709/203 |
| 9,141,325 B2 * | 9/2015 | Dersy | H04W 76/00 |
| 9,191,721 B2 * | 11/2015 | Holladay | H04N 21/43615 |
| 9,374,351 B1 * | 6/2016 | Basha P. R. | H04L 63/0807 |
| 9,485,233 B1 * | 11/2016 | Basha P. R. | H04L 63/08 |
| 9,495,194 B1 * | 11/2016 | Twitchell, Jr. | H04L 67/1097 |
| 9,609,383 B1 * | 3/2017 | Hirst | G06F 3/165 |
| 9,656,161 B1 * | 5/2017 | Bowman | A63F 13/12 |
| 9,760,730 B2 * | 9/2017 | Vajravel | G06F 21/6218 |
| 9,858,126 B2 * | 1/2018 | Dai | G06F 9/4413 |
| 2005/0195660 A1 * | 9/2005 | Kavuri | G06F 3/0605 365/189.05 |
| 2006/0094472 A1 * | 5/2006 | Othmer | G10L 19/20 455/563 |
| 2006/0225065 A1 * | 10/2006 | Chandhok | G06F 11/1458 717/168 |

(Continued)

*Primary Examiner* — Daeho D Song
(74) *Attorney, Agent, or Firm* — Baker Botts L.L.P.

(57) ABSTRACT

To provide the full functionality available locally at a client, a display-port audio playback device, such as a display-port monitor, is redirected to a server. This provides a remote user with the same experience as the local user. Applications at the server may be associated with any one or more virtualized display-port audio playback devices in a similar manner as associating a local client application to a local display-port audio playback device. The audio data associated with a request of a server application may be directed only to the virtual display-port audio playback device associated with the server application. Any application at the server may be associated with any one or more virtual display-port audio playback devices.

21 Claims, 5 Drawing Sheets

(56) References Cited

U.S. PATENT DOCUMENTS

| | | | |
|---|---|---|---|
| 2007/0025694 A1* | 2/2007 | Takashima | G11B 27/322 386/248 |
| 2009/0088208 A1* | 4/2009 | Xu | H04M 1/2535 455/557 |
| 2009/0106493 A1* | 4/2009 | Tsuji | G06F 3/0605 711/114 |
| 2009/0150550 A1* | 6/2009 | Barreto | H04L 29/08846 709/228 |
| 2010/0321395 A1* | 12/2010 | Maciesowicz | G06F 3/14 345/502 |
| 2011/0154192 A1* | 6/2011 | Yang | G06F 17/2288 715/256 |
| 2011/0277028 A1* | 11/2011 | Piazza | H04L 63/0209 726/11 |
| 2012/0096358 A1* | 4/2012 | Barnes, Jr. | G06Q 10/1053 715/728 |
| 2012/0158822 A1* | 6/2012 | Dai | G06F 9/4413 709/203 |
| 2013/0111561 A1* | 5/2013 | Kaushik | H04L 63/105 726/4 |
| 2013/0179507 A1* | 7/2013 | Williams | H04L 65/4007 709/204 |
| 2013/0211826 A1* | 8/2013 | Mannby | G10L 19/00 704/201 |
| 2013/0238996 A1* | 9/2013 | Ding | G06F 3/165 715/716 |
| 2014/0047143 A1* | 2/2014 | Bateman | H04N 7/181 710/72 |
| 2014/0082235 A1* | 3/2014 | Kaushik | G06F 13/102 710/62 |
| 2014/0085484 A1* | 3/2014 | Kambhatla | G09G 5/006 348/180 |
| 2014/0157128 A1* | 6/2014 | Hussain | G06F 3/04883 715/727 |
| 2014/0330978 A1* | 11/2014 | Venkatesh | H04L 29/08567 709/226 |
| 2015/0054755 A1* | 2/2015 | Kambhatla | G09G 5/006 345/173 |
| 2015/0205749 A1* | 7/2015 | Whitby-Strevens | G06F 13/426 348/207.11 |
| 2016/0150043 A1* | 5/2016 | Petronic | H04L 61/2546 709/220 |
| 2016/0171925 A1* | 6/2016 | Hussain | G09G 3/2096 710/12 |
| 2017/0031852 A1* | 2/2017 | Vajravel | G06F 13/4282 |
| 2017/0094074 A1* | 3/2017 | Yokokawa | G06F 3/1423 |

* cited by examiner

FIG. 6

SYSTEM AND METHOD TO REDIRECT DISPLAY-PORT AUDIO PLAYBACK DEVICES IN A REMOTE DESKTOP PROTOCOL SESSION

FIELD

The disclosure relates in general to redirecting audio playback devices to a remote desktop protocol session, and more particularly to redirecting display-port audio playback devices, such as a display-port monitor, in a remote desktop protocol session.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One approach to the design and implementation of information handling systems for computer networks, particularly with regard to the development of client/server applications, includes designing client applications and client terminals so that the majority of the heavily used resources are at a remote computing machine, such as a centralized server, connected via a network. The client terminals generally have minimal memory, disk storage, and processor power, but are designed under the premise that most users connected to a powerful server do not need the additional processing power. With these client terminals, the total cost of ownership is minimized, because of the reduced resources and because the clients can be centrally administered and updated from the server. As such, these client terminals are suited for a network that can handle a significant number of terminals. If the client terminals have devices attached to them, then when the client terminals are connected to the server, not only the client terminals but also the client terminals' devices can become available to the server.

Some information handling systems have externally connected devices, such as monitors. One type of monitor is a display-port monitor that supports multi-channel audio playback as well as many advanced audio features. When multiple display-port monitors are connected to an information handling system, such as a thin client, the operating system (such as Windows) will recognize each display-port monitor as a separate display-port audio playback device. However, remote desktop protocols only redirect the default display-port monitor. The present invention solves this problem.

SUMMARY

In one embodiment, a method to redirect a display-port audio playback device in a remote desktop protocol session comprises receiving at a server a notification to create a virtual display-port audio playback device from a client coupled to a corresponding display-port audio playback device. The virtual display-port audio playback device is created at the server and corresponds to the display-port audio playback device coupled to the client. In one embodiment, each time a display-port audio playback device is created, it is associated with an application where the application may be a local application of the server or a virtual application. In other embodiments, the virtual display-port audio playback device is not associated with an application until a request for access to the virtual display-port audio playback device is received. In one embodiment, the virtual display-port audio playback device comprises two or more virtual display-port audio playback devices and any or each of the two or more virtual display-port audio playback devices are associated with the same application or different applications. A request is received from the application and based, at least in part, on that request the virtual display-port audio playback device associated with the application is selected. The audio data associated with the received request from the application is compressed by the selected virtual display-port audio playback device into a format acceptable to the display-port audio playback device coupled to the client. The compressed audio data is sent to the display-port audio playback device at the client that corresponds to the virtual display-port audio playback device.

In one embodiment, a custom remote audio endpoint enumerator identifies the virtual display-port audio playback device to create. In another embodiment, the virtual display-port audio playback device corresponds to a display-port monitor. In one embodiment selecting the virtual display-port audio playback device associated with the application comprises communicating with one or more core audio application programming interfaces of the server and one or more high-level application programming interfaces of the server. The one or more core audio application programming interfaces may communicate with the virtual display-port audio playback device via a custom remote endpoint enumerator.

In one embodiment, a computer readable non-transitory storage media embodying software is operable when executed to perform any one or more of the disclosed embodiments or equivalents thereof. In another embodiment a system comprises one or more processors and a memory coupled to the one or more processors where the memory comprises instructions executable by the one or more processors and where the one or more processors are operable when executing (or capable of executing or programmed to execute) the instructions to perform any one or more of the disclosed embodiments or equivalents thereof.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Frequently, devices connected to client terminals (also referred to as "clients," "thin-clients" or "client-side devices") are virtualized on a server to provide access to the devices from user sessions on the server. The virtualized devices (or redirected devices) are accessible from a large number of user sessions and/or client terminals providing many client terminals the necessary support to fulfill a given computing function. For example, in an office environment, multiple user sessions and/or clients may be connected to a server on which the device is virtualized (or redirected), and all of the multiple user sessions and/or clients connected to the server may have access to the device.

For example, in one computer network environment, multiple display-port monitors may be connected to a single thin-client. Each display-port monitor may be recognized by the operating system (OS), such as Windows, as a separate display-port audio playback device. The audio of an application, including local or virtual applications, may be restricted to play in a specified display-port monitor or a specified selection of display-port monitors. For example, the playback of files by Windows Media Player may be restricted to a specified display-port monitor while the playback of video/audio files by Windows Internet Explorer may be restricted to another specified display-port monitor.

In certain remote desktop environments, such as a Windows desktop hosted in a Cloud desktop, only one playback device may be virtualized. For example, in the case of remote desktop protocol (RDP), Citrix independent computing architecture (ICA), personal computer over internet protocol (PCOIP) and any other similarly limited protocol known to one of ordinary skill in the art only the default playback device of a client or thin-client, is redirected. This limits access of remote applications/devices to only the one playback device even though other playback devices may be available at the client. That is, the protocols do not permit the remote desktop environment to take advantage of a display-port audio playback feature, such as the display-port audio playback feature available in the Windows OS. Further, the remote desktop environment does not provide the same experience to remote clients as that available at the local client; the remote clients do not have access to multiple display-port monitors whereas the local client does. For example, at a local client running Windows as its OS, a file may be played or specified to be played in any of the connected display-port monitors while the remote desktop is only permitted to playback files in a single (the default) display-port monitor.

A need therefore exists for systems and methods that provide access to the cloud desktop or the remote desktop to all the available audio channels of a given client as opposed to only a single audio channel (the redirected default audio channel). The present invention provides redirection of all available display-port audio playback devices connected to a client to a remote server, which enables the remote server (or cloud desktop) to take advantage of display-port features making the experience of users at the local client and users at a remote client the same.

In the following description, details are set forth by way of example to facilitate discussion of the disclosed subject matter. It should be apparent to a person of ordinary skill in the art, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a personal digital assistant (PDA), a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices (such as universal serial bus (USB) mass storage devices), one or more communications ports for communicating with external devices as well as various input and output (I/O) devices, such as a keyboard, a mouse, a wireless device, for example, a Bluetooth device, a video display (such as a display-port monitor), and any other device known to one of ordinary skill in the art. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Particular embodiments are best understood by reference to FIGS. 1-6, wherein like numbers are used to indicate like and corresponding parts.

Figure 1:
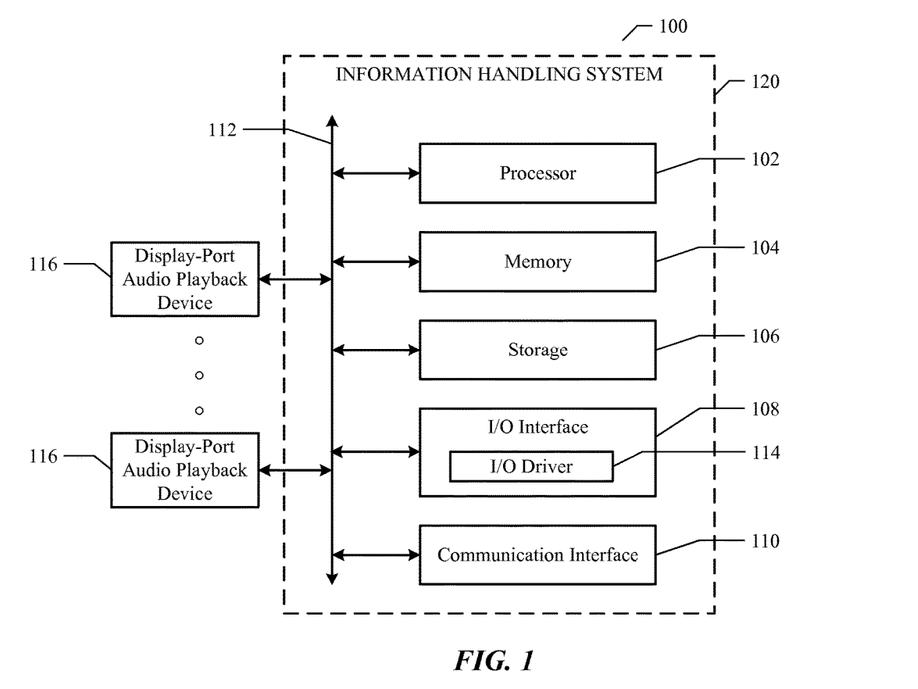
FIG. 1 is a conceptual block diagram of selected elements of an information handling system according to one embodiment of the present disclosure.

FIG. 1 illustrates a simplified diagram of information handling system configuration 100 in accordance with an aspect of the present disclosure. In particular embodiments, one or more information handling systems 120 perform one or more steps of one or more methods described or illustrated herein. In particular embodiments, one or more information handling systems 120 provide functionality described or illustrated herein. In particular embodiments, software running on one or more information handling systems 120 performs one or more steps of one or more methods described or illustrated herein or provides functionality described or illustrated herein. Particular embodiments include one or more portions of one or more information handling systems 120. Herein, reference to an information handling system may encompass a computing device, and vice versa, where appropriate. Moreover, reference to an information handling system may encompass one or more information handling systems, where appropriate.

This disclosure contemplates any suitable number of information handling systems 120. This disclosure contemplates information handling system 120 taking any suitable physical form. As example and not by way of limitation, information handling system 120 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, a terminal, a thin client, a slim client, a lean client, or a combination of two or more of these. Where appropriate, information handling system 120 may include one or more information handling systems 120; be unitary or distributed; span multiple locations; span multiple machines; span multiple data centers; or reside in a cloud, which may include one or more cloud components in one or more networks. Where appropriate, one or more information handling systems 120 may perform without substantial spatial or temporal limitation one or more steps of one or more methods described or illustrated herein. As an example and not by way of limitation, one or more information handling systems 120 may perform in real time or in batch mode one or more steps of one or more methods described or illustrated herein. One or more information handling systems 120 may perform at different times or at different locations one or more steps of one or more methods described or illustrated herein, where appropriate.

In particular embodiments, information handling system 120 includes a processor 102, memory 104, storage 106, an input/output (I/O) interface 108, a communication interface 110, a bus 112, and an I/O driver 114. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up one or more modules of a computer program, for example, software. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 120 may load instructions from storage 106 or another source (such as, for example, another information handling system 120) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multiported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a USB drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 120 and one or more display-port audio playback devices 116. Information handling system configuration 100 may include one or more of these display-port audio playback devices 116, where appropriate. In particular embodiments, the display-port audio playback device 116 may be a display-port monitor or any other type of display-port audio device known to one of ordinary skill in the art. One or more of these display-port audio playback devices 116 may enable communication between a user (such as a person, administrator, another device or information handling system) and information handling system 120. As an example and not by way of limitation, a display-port audio playback device 116 may include a display-port monitor or another suitable display-port audio playback device 116 or a combination of two or more of these display-port audio playback devices 116. A display-port audio playback device 116 may include one or more sensors. This disclosure contemplates any suitable display-port audio playback devices 116 and any suitable I/O interfaces 108 for them. Where appropriate, I/O interface 108 may include one or more I/O drivers (such as device or software drivers) 114 enabling processor 102 to drive one or more of these display-port audio playback devices 116. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both for providing one or more interfaces for communication (such as, for example, packet-based communication) between information handling system 120 and one or more other information handling systems 120 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 120 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 120 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 120 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 120 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

Figure 2:
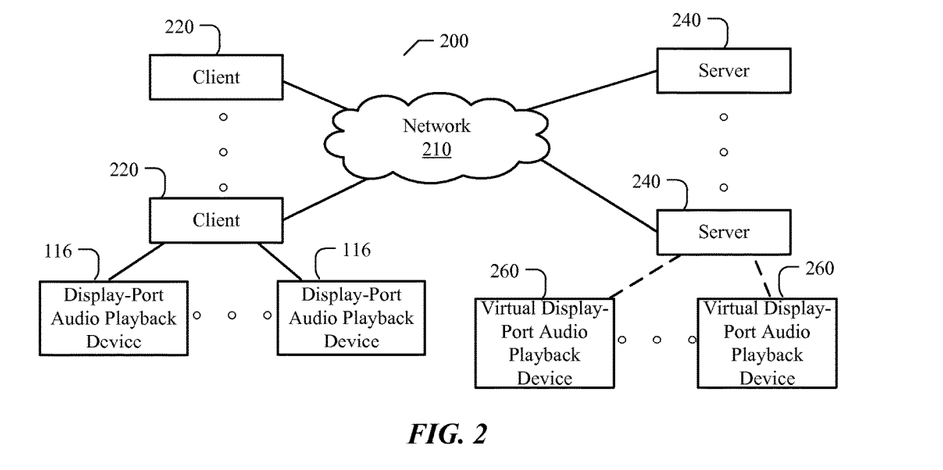
FIG. 2 is a conceptual block diagram of selected elements of a computer network environment according to one embodiment of the present disclosure.

FIG. 2 is a conceptual block diagram of selected elements of a computer network environment 200 according to an aspect of the disclosure. In particular embodiments, one or more client devices 220 and one or more servers 240 are connected via network 210. Network 210 may be a public network or a private (for example, corporate) network. Additionally, network 210 may be, for example, a Local Area Network (LAN), a Wide Area Network (WAN), a wireless network, the Internet, an intranet or any other suitable type of network. One or more client devices 220 may be connected to the network 210 via a network switch (not shown). In particular embodiments, network 210 may include one or more routers for routing data between client devices 220 and/or servers 240. A device (for example, a client device 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (for example, customer sites) or subnets. As an example, a corporate network may include potentially thousands of offices or branches, each with its own subnet (or multiple subnets) having many devices. One or more client devices 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client device 220 may be a desktop computer, a laptop computer, a tablet computer, a handheld device, a mobile phone, a kiosk, a vending machine, a billboard, or any suitable information handling system 120. In particular embodiments, a client device 220 is an embedded computer and may have flash memory (for example, a solid state drive) instead of a hard disk drive. In particular embodiments, a client device 220 is a thin client having limited processing capabilities and limited storage, and such a thin client may require minimal management and updates. A client device 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

In particular embodiments, a client device 220 may connect to a display-port audio playback device 116. The present invention contemplates client device 220 connecting to any number of display-port audio playback devices 116. Further, the present invention contemplates any number of client devices 220 connecting to one or more display-port audio playback devices 116 such that multiple client devices 220 may be connected to one or more unique display-port audio playback devices 116. In particular embodiments, any number of client devices 220 may be connected to the same display-port audio playback device(s) 116, display-port audio playback device(s) 116, or any combination thereof.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (for example, VMware® Virtual Machine), a desktop session (for example, Microsoft Terminal Server), a published application (for example, Microsoft Terminal Server), or any suitable information handling system 120. As an example, a private (for example, corporate) network may include a device manager server and a repository server each configured to communicate with multiple client devices 220 across one or more domains, sites, or subnets of network 210. In particular embodiments, a server 240 may include one or more servers, or functions of one or more servers. A client device 220 may access software resources provided by a server 240 such as, for example, OS, add-ons, content, or any other suitable data, applications, or images. A server 240 may provide software or other resources automatically to one or more client devices 220.

It may be desirable, in the case of a private (for example, corporate) network including multiple sites or subnets to deploy software (including, for example, all or part of one or more operating systems, applications, add-ons, or data) to one or more client devices 220 across one or more sites or subnets. The client devices 220 may, for example, be located remotely from one or more servers 240 (including, for example, device managers or resource repositories).

In particular embodiments, one or more servers 240 of a network 210 may include a virtual display-port audio playback device 260, such as a virtual display-port monitor or any other virtual display-port audio device known to one of ordinary skill in the art. While the virtual display-port audio playback device 260 is not locally or physically connected to the server 240, the virtual display-port audio playback device 260 appears to the server 240 as if it is locally connected to the server 240. Thus, display-port audio playback device 116 appears to the server 240 as a virtual display-port audio playback device 260. The present invention contemplates server 240 virtualizing and accessing any number of virtual display-port audio playback devices 260 corresponding to any one or more display-port audio playback devices 116 connected to any one or more client devices 220. Further, the present invention contemplates any number of servers 240 accessing one or more virtual display-port audio playback devices 260 such that multiple servers 240 may access one or more virtual display-port audio playback devices 260. In particular embodiments, any number of servers 240 may access virtual display-port audio playback device(s) 260, different virtual display-port audio playback device(s) 260, or any combination thereof.

As used herein, a "local" device of information handling system 120, or a device "locally" connected to information handling system 120, may be a device directly connected to the system using one or more wires or connectors (for example, physically connected to the system), or a device directly connected to the system using a wireless link. For example, display-port audio playback device 116 is a local device coupled to information handling system 120 (or client device 220). Display-port audio playback device 116 may be coupled using a USB connection to client device 220 or any other suitable connection known to one of ordinary skill in the art. Furthermore, in one aspect of the disclosure, a local device of an information handling system 120 or a device locally connected to information handling system 120 may include a device within the information handling system 120 (for example, an internal device (not shown) of client device 220).

A "remote" device, or a device "remote" to information handling system 120, may be a device that is not directly connected to information handling system 120. For example, server 240 is remote to both client device 220 and display-port audio playback device 116 because server 240 is not directly connected to client device 220 or display-port audio playback 116 but connected indirectly through network 210, which can include, for example, another server 240, or the Internet.

In particular embodiments, client device 220 (for example, a thin client, a slim client, or a lean client) or one or more software components associated with client device 220 may depend on server 240 to fulfill its computational roles. As an example of a Virtual Desktop Infrastructure (VDI) and not by way of limitation, client device 220 may provide one or more terminal services to one or more users of client device 220. As such, the users of client device 220 may login to the same server 240 and perform tasks on the same server 240 substantially at the same time. In the VDI, one or more display-port audio playback devices 116 may be connected to client device 220. In particular embodiments, in order for the display-port audio playback device 116 to work seamlessly, communications associated with the display-port audio playback device 116 may be redirected to a Virtual Desktop (VD) OS or a Virtual Machine (VM) OS (for example, WINDOWS SERVER 2003) of the VDI.

Figure 3:
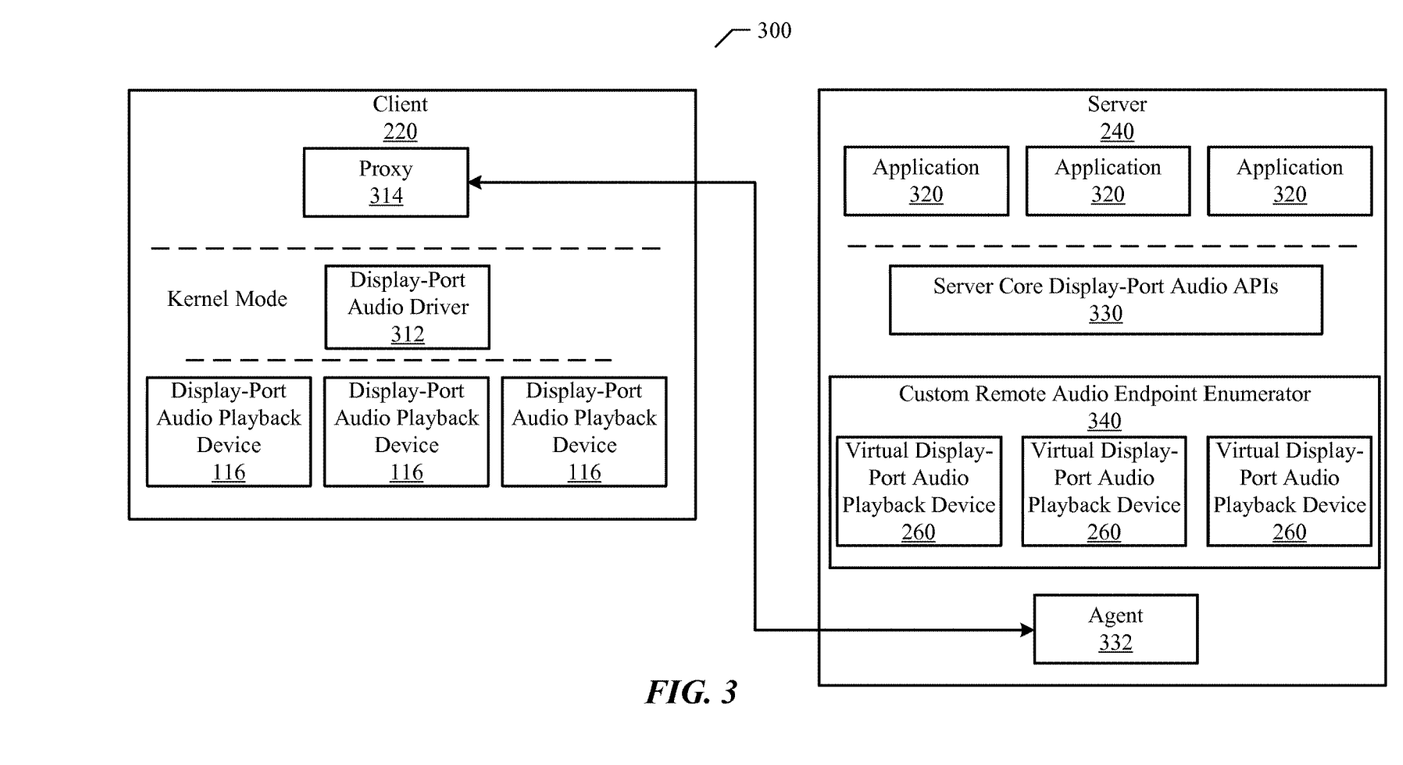
FIG. 3 is a conceptual block diagram of selected elements for redirecting display-port audio playback devices in a remote desktop protocol session according to one or more embodiments of the present disclosure.

FIG. 3 is a conceptual block diagram 300 of selected elements for redirection of display-port audio playback devices 116 in a RDP session according to one or more embodiments of the present disclosure. In one embodiment, one or more RDP may be utilized, for example, Microsoft RDP, CITRIX ICA, VMVIEW RDP/personal computer over internet protocol (PCoIP), and Teradici PCoIP. Client 220 may include a proxy 314. Proxy 314 on client 220 may coordinate communications between display-port audio playback device 116 and an agent 332 running on server 240. Proxy 314 may communicate with agent 332 via a socket or virtual channel. Proxy 314 may be configured to receive socket connection information from server 240 and initiate redirecting transactions between display-port audio playback device 116 and agent 332. The present disclosure contemplates any number of display-port audio playback devices 116 coupled to client 220. For example, in one embodiment, three display-port monitors are coupled to client 220. Client 220 may build the kernel mode display-port audio driver 312 when client 220 detects that the display-port audio playback device 116, such as a display-port monitor, is capable of playing back audio.

Server 240 may include an agent 332. Agent 332 of server 240 may be configured to register with the OS of server 240 to receive notification of an establishment of any remote access connection. If display-port audio playback device 116 is configured to be redirected to server 240, the redirection may operate generally as described in U.S. Pat. No. 8,010,630 to Barreto, et al., which is incorporated herein by reference. In one embodiment, display-port audio playback device 116 is redirected to server 240 as virtual display-port audio playback device 260.

Agent 332 may request that the custom remote audio endpoint enumerator 340 to build or create one or more virtual display-port audio playback devices 260 that correspond to the one or more display-port audio playback devices 116. The OS of the server 240 identifies the display-port audio playback devices 116 attached to the client 220 through the custom remote audio endpoint enumerator 340. The OS of the server 240 may be a Windows OS that supports the custom remote audio endpoint enumerator 340. The custom remote audio endpoint enumerator 340 may return to one or more applications 320 one or more endpoints that correspond to one or more criteria specified by the requesting application 320. For example, customer remote audio endpoint enumerator 340 may return a communication endpoint, a playback endpoint (for example, one or more display-port audio playback devices 116), or a capture endpoint.

One or more applications 320 may be local to server 240 or may be virtual applications. One or more applications 320 at server 240 may access or select the appropriate one or more virtual display-port audio playback devices 260 by utilizing a server core audio API's 330 and/or higher-level API's. The server core audio APIs 330 communicate with the one or more virtual display-port audio playback devices 260 of a custom remote audio endpoint enumerator 340.

Figure 4:
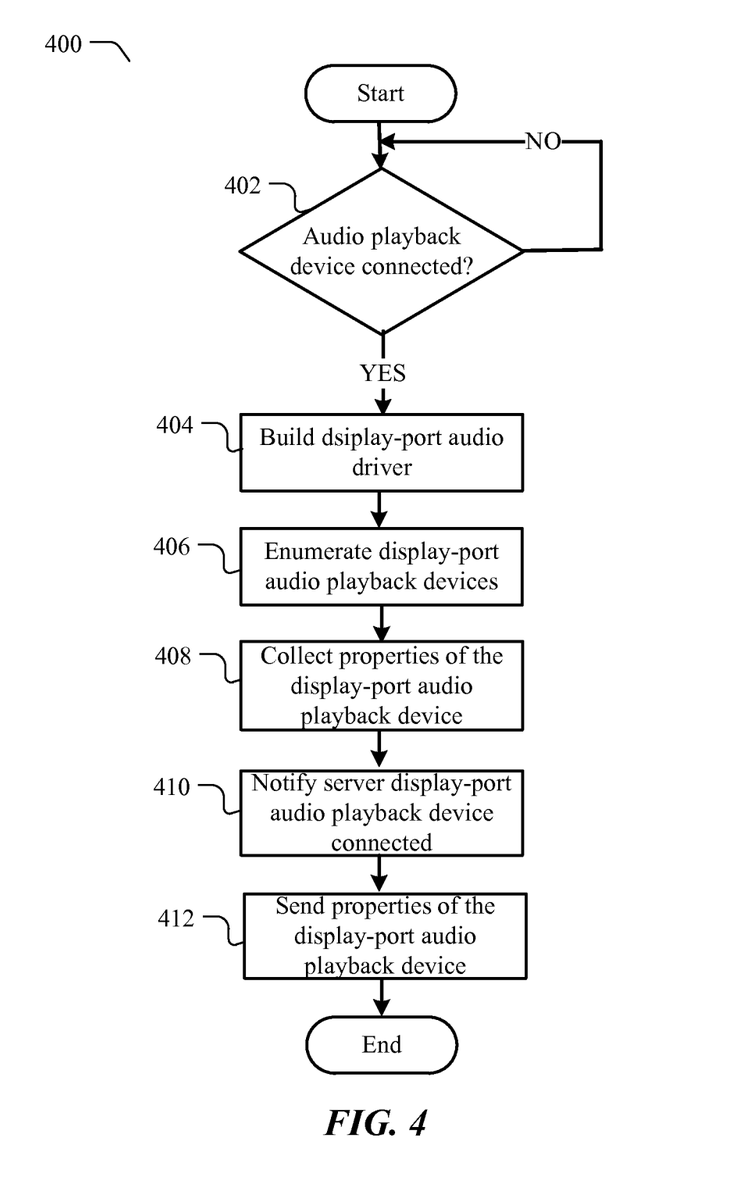
FIG. 4 is a flowchart illustrating an exemplary method for redirecting a display-port audio playback device according to one or more embodiments of the present disclosure.

FIG. 4 is a flowchart in accordance with one or more embodiments of the present disclosure, shown generally at 400, relating to redirecting one or more display-port audio playback devices 116, such as one or more display-port monitors, at client 220 to a server 240.

At step 402, the client 220 polls to determine if a display-port audio playback device 116 has been connected to client 220. For example, client 220 may continuously poll to detect whether a newly connected display-port audio playback device has been connected to the client 220. For example, client 220 may loop at step 402 continuously, upon a predetermined time interval, or at any other interval or way known to one of ordinary skill in the art until a display-port audio playback device 116 is detected. Client 220 may detect a display-port audio playback device 116 connected to the client 220 by any process known to one of ordinary skill in the art. For example, in one embodiment a user may use a graphical user interface (GUI) to inform the client 220 that a display-port audio playback device 116 has been connected. In another embodiment, the client 220 may automatically detect without user intervention the connection of a display-port audio playback device 116. Display-port audio playback device 116 may be any known display-port audio playback device, for example, a display-port monitor. Client 220 may poll for a connected display-port audio playback device 116 in any way known to one of ordinary skill in the art, including, but not limited to, by utilizing an interrupt, timer, semaphore, etc.

If at step 402 a display-port audio playback device 116 is detected, then at step 404 the client 220 builds the kernel mode display-port audio driver 312. Client proxy 314 may communicate directly with display-port audio driver 312. At step 406, the proxy 314 enumerates the one or more display-port audio playback devices 116. At step 408, the proxy 314 collects the one or more properties of the one or more display-port audio playback devices 116. The one or more properties may include one or more of number of audio channels, audio compression format supported, device period, sample rate, average bytes per second, bits per sample, any other properties known to one of ordinary skill in the art, and any combination of the aforementioned properties. At step 410, the proxy 314 notifies the server 240 via agent 332 that one or more display-port audio playback devices 116 have been connected and are ready to be redirected at the server 240. At step 412, the proxy 314 sends the one or more properties of the one or more display-port audio playback devices 116 to the agent 332 of the server 240.

Figure 5:
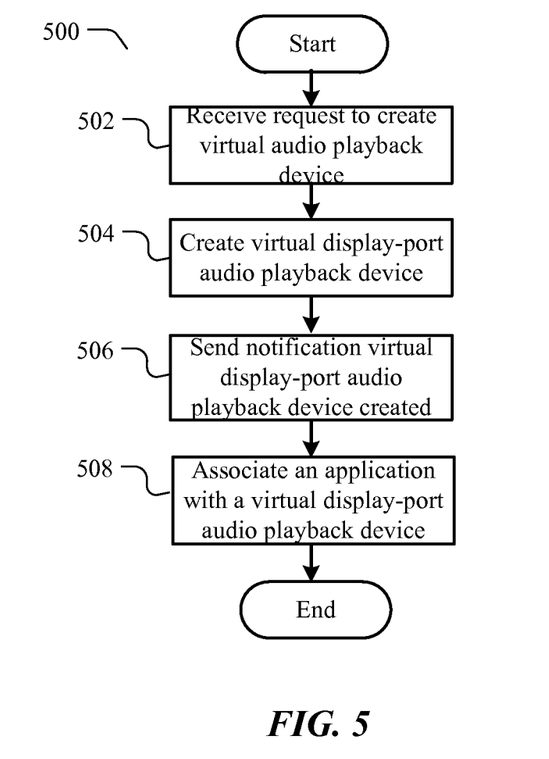
FIG. 5 is a flowchart illustrating an exemplary method for creating a virtual display-port audio playback device according to one or more embodiments of the present disclosure.

FIG. 5 is a flowchart in accordance with one or more embodiments of the present disclosure, shown generally at 500, relating to receiving from a client 220 a request to create and creating one or more virtual display-port audio playback devices 260, such as one or more virtual display-port monitors, at a server 240. At step 502, the server 240 receives a notification (for example, a device plug-in notification) from the client 220 that a display-port audio playback device 116 is ready for virtualization such that the audio playback device 116 may be accessible from one or more applications 320 at a server 240. The one or more applications 320 may be applications local to server 140 or virtual applications of server 240.

At step 504, the server 240 via the custom remote audio endpoint enumerator 340 creates a virtual display-port audio playback device 260 that corresponds to the display-port audio playback device 116. The virtual display-port audio playback device 260 may be created based, at least in part, on one or more parameters transmitted to the server 240. The one or more parameters may be transmitted to the server 240 as part of a notification that one or more display-port audio playback devices 116 have been connected to the client 220 or as part of a request received from the client 220 for the server 240 to create one or more virtual display-port audio playback devices 260 that correspond to the connected display-port audio playback devices 116 at the client 220.

At step 506, the custom remote audio endpoint enumerator notifies the server (or an agent running at the server) that the virtual display-port audio playback device has been created and is accessible by any one or more applications 320.

At step 508, an application 320 may be associated with a created virtual display-port audio playback device 260. For example, in one embodiment, an application 320, such as Windows Media Player, is associated with a specific virtual display-port audio playback device 260 such that any audio requests from the application 320 will only be played back at the associated virtual display-port audio playback device 260. The association between an application 320 and a specific virtual display-port audio playback device 260 may be altered at any time, at boot-up, installation of a new application 320, virtualization of a display-port audio playback device 260 or at any other time known to one of ordinary skill in the art. The association may also be set or altered by a user or another information handling system 120 (for example, a client device 220 or a server 240). The association may be set by a user through a graphical user interface, a command-line interface, or any other interface known to one of ordinary skill in the art. The association may be stored in a register value, a table, a database, a file, or any other storage location known to one of ordinary skill in the art. The association may be set or altered by another computing device, such as another information handling system 120 automatically, at timed intervals, upon detection or notification of a connected display-port audio playback device 116, or any other way known to one of ordinary skill in the art. The association may be based, at least in part, on one or more parameters such as workload of the virtual display-port audio playback device 260, proximity of the associated display-port audio playback device 116 to a user at a client 220, type of virtual display-port audio playback device 260, one or more functions or capabilities of the virtual display-port audio playback device 260, type of compression handled by the virtual display-port audio playback device 260, bandwidth, or any other parameters known to one of ordinary skill in the art. The one or more parameters may be transmitted from the client 220 to the server 240 as part of the notification/creation request from the client 220.

In one embodiment, the virtual display-port audio playback device 260 is associated with an application 320 through interaction with a user or another application 320 or program. For example, the application 320 that requested audio playback may query the OS (after completion of step 508, for example) for the available virtual display-port audio playback devices 260. The application 320 may then enumerate these available virtual display-port audio playback devices 260. In one embodiment, the application 320 enumerates the available virtual display-port audio playback devices 260 by listing them in a graphical user interface (GUI). A user may then interact with the GUI to select a virtual display-port audio playback device 260 for playing back the requested audio. In another embodiment, the application 320 may enumerate the available virtual display-port audio playback devices 260 via a command-line interface (CLI). The user would then interact with the CLI to select a virtual display-port audio device 260 for playing back the requested audio. In another embodiment, another application 320 may interact with a CLI, a GUI, an API, or any other way known to one of ordinary skill in the art and may select the virtual display-port audio playback device 260 for playing back the requested audio based, at least in part, on one or more parameters. For example, the one or more parameters may include network speed, proximity of the display-port audio playback device 116 to the server 240, network bandwidth, or any other parameters known to one of ordinary skill in the art.

Figure 6:
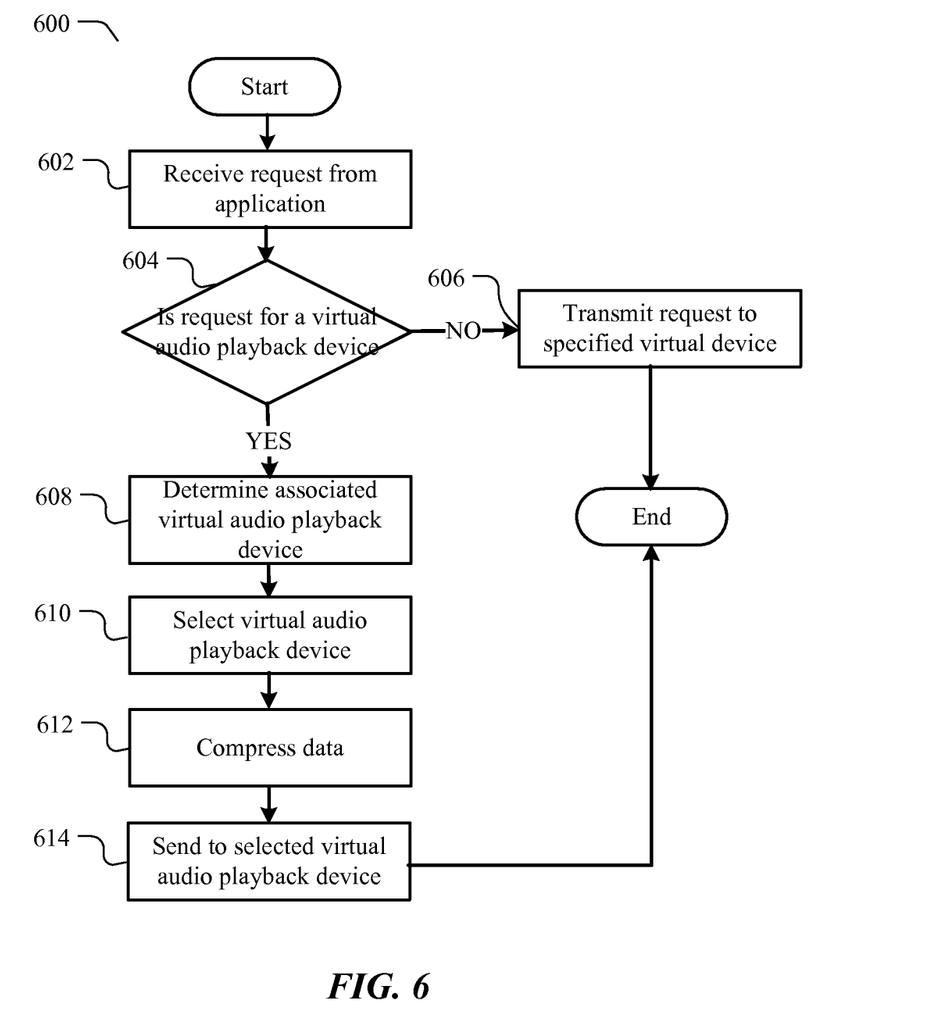
FIG. 6 is a flowchart illustrating an exemplary method for handling a request from an application to a virtual display-port audio playback device according to one or more embodiments of the present disclosure.

FIG. 6 is a flowchart in accordance with an embodiment of the present disclosure, shown generally at 600, relating to processing a request to playback audio at one or more virtual display-port audio playback devices 260. At step 602, a request is received from one or more applications 320 at the server 240. In one embodiment, at least one of the one or more applications 320 is local to the server. In another embodiment, at least one of the one or more applications 320 is a virtual application. At step 604, it is determined if the request is for at least one of the one or more virtual display-port audio playback devices 260 to playback audio data, such as to playback audio data at a virtual display-port monitor.

If at step 604, it is determined that the received request is not for a virtual display-port audio playback device 260, then the received request is transmitted at step 606 to a virtual device specified by the request, such as a virtual USB device. For example, the received request may contain data specifying that the request should be directed to a specific virtual device of the server 240 or a specific type of virtual device of the server 240. In another example, additional data may be added by the server 240 to the received request that includes the information necessary to direct the received request to the appropriate virtual device, including information for a virtual display-port audio playback device 260.

If at step 604 it is determined that the received request is for at least one of the one or more virtual display-port audio playback devices 260, then at step 608 it is determined which virtual display-port audio playback device 260 is associated with the received request from an application 320. For example, a request from a particular application 320, such as Windows Media Player, may be associated with a first virtual display-port audio playback device 260. In one embodiment, a request from another application 320, such as Windows Internet Explorer, may be associated with a second virtual display-port audio playback device 260. The determination at step 606 may be based, at least in part, on a register of the OS that stores a value indicative of the appropriate virtual display-port audio playback device to direct playback requests to when sent from a particular application. For example, in a Windows OS, a first display-port audio playback device 116 may be mapped to a first virtual display-port audio playback device 260, and so on until all display-port audio playback devices 116 have been mapped to a corresponding virtual display-port audio playback device 260. In one or more embodiments, the virtual display-port audio playback device 260 is associated with application, for example, in any manner described at step 508 of FIG. 5.

Once the virtual display-port audio playback device 260 associated with the request is determined at step 608, the process continues to step 610. At step 610, the virtual display-port audio playback device 260 that was determined to be associated with the received request is selected. Once the virtual display-port audio playback device 260 has been selected, the received request will be processed only by the selected virtual display-port audio playback device 260. For example, in one embodiment, a request is received from Windows Media Player where the request is associated with two of the virtual display-port audio playback devices 260. That is, two of the virtual display-port audio playback devices 260 will handle or playback the audio data from the received request. In one or more other embodiments, more than two virtual display-port audio playback devices 260 may be selected. In another embodiment, only one virtual display-port audio playback device 260 are selected. The server 240 may utilize one or more server core display-port audio API's 330 and/or one or more high-level API's or any other APIs known to one of ordinary skill in the art, or any combination thereof to select the appropriate virtual display-port audio playback device 260. At the server 240, the one or more server core audio API's 330 communicate with a virtual display-port audio playback device 260 via a custom remote endpoint enumerator 340.

At step 612, the selected virtual display-port audio playback device 260 (or the at least one of the one or more virtual display-port audio playback devices 260) compresses the audio data associated with the request. The virtual display-port audio playback device 260 may compress the audio data into a format expected by the corresponding display-port audio playback device 116, such as a format supported by a display-port audio monitor. In one or more embodiments the compressed format may be at least one of directory replication traffic (DRA), Dolby metadata enhanced audio transmission (MAT), digital theater systems (DTS) high definition (HD), or any other compressed format known to one of ordinary skill in the art.

At step 614, the selected virtual display-port audio playback device 260 transmits the compressed audio data to the corresponding display-port audio playback device 116 via custom remote audio endpoint enumerator 340 through agent 332 to proxy 314. In one embodiment, the compressed audio and video data associated with the received request are transmitted simultaneously to the corresponding display-port audio playback device 116. In another embodiment, the compressed audio and video data associated with the received request are transmitted separately to the corresponding display-port audio playback device 116.

As the audio playback data is compressed in a format appropriate for the display-port audio playback device 116 and the compressed audio playback data is sent directly to a display-port audio playback device 116, client-side resources are not consumed or are not consumed as much as in traditional methods for processing such audio playback data.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (for example, one or more of blocks, modules, elements, components or processors) for performing one or more functions or operations. In one aspect, such an item may be an apparatus, hardware, or a portion thereof. In one example, an item may have a structure in the form of, for example, an instruction(s) encoded or stored on a machine-readable medium, on another device, or on a portion thereof. An instruction(s) may be software, an application(s), a subroutine(s), or a portion thereof. The instructions(s) may be for performing the function(s) or operation(s). The instruction(s) may be executable by one or more processors to perform the function(s) or operation(s). One or more processors may execute the instruction(s) by, for example, transferring or copying and instructions into an executable memory space and executing the instructions. In one example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (for example, a digital signal processor (DSP), an application specific integrated circuit (ASIC), a field programmable gate array (FPGA), etc.), as a portion(s) of any of the foregoing, or as a combination(s) of any of the foregoing. Those skilled in the art will recognize how to implement the instructions, circuits, and processing systems.

In one aspect of the disclosure, when actions or functions (for example, hooking, modifying, intercepting, redirecting, determining, traversing, obtaining, creating, operating, deleting, removing, receiving, providing, generating, converting, displaying, notifying, accepting, selecting, controlling, transmitting, reporting, sending, or any other action or function) are described as being performed by an item (for example, one or more of blocks, modules, elements, components or processors), it is understood that such actions or functions may be performed, for example, by the item directly. In another example, when an item is described as performing an action, the item may be understood to perform the action indirectly, for example, by facilitating such an action (for example, assisting, allowing, enabling, causing, or providing for, such action to occur; or performing a portion of such an action). For example, determining can refer to facilitating determination, attaching can refer to facilitating attaching, and receiving can refer to facilitating receiving. In one aspect, performing an action may refer to performing a portion of the action (for example, performing a beginning part of the action, performing an end part of the action, or performing a middle portion of the action).

A reference to an element in the singular is not intended to mean "one and only one" unless specifically so stated, but rather "one or more." For example, a client may refer to one or more clients, a server may refer to one or more servers, an operation may refer to one or more operations, and a signal, message, or communication may refer to one or more signals, messages, or communications.

Unless specifically stated otherwise, the term "some" refers to one or more. Pronouns in the masculine (for example, his) include the feminine and neuter gender (for example, her and its) and vice versa. Headings and subheadings, if any, are used for convenience only and do not limit the invention.

A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "coupled" or the like may refer to being directly coupled. In another aspect, the term "coupled" or the like may refer to being indirectly coupled or communicatively coupled.

Various items may be arranged differently (for example, arranged in a different order, or partitioned in a different way) all without departing from the scope of the subject technology. In one aspect of the disclosure, the elements recited in the accompanying claims may be performed by one or more modules or sub-modules. For example, a local link creation module and a local link deletion module may be combined into one module.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    receiving, at a server, a notification from a client to create a virtual display-port audio playback device associated with a display-port audio playback device of the client;
    in response to the notification, creating, at the server, the virtual display-port audio playback device based, at least in part, on one or more parameters of the associated display-port audio playback device received from the client;
    associating a server application with the virtual display-port audio playback device such that any requests from the server application will only be played back at the associated virtual display-port audio playback device;
    receiving a request from the server application to select the associated virtual display-port audio playback device;
    in response to the request, selecting the virtual display-port audio playback device associated with the server application;
    compressing audio data associated with the received request by the selected virtual display-port audio playback device; and
    sending the compressed audio data directly to the display-port audio playback device that corresponds to the selected virtual display-port audio playback device such that the audio data is compressed in a format supported by the display-port audio playback device.

2. The method of claim 1, further comprising:
    identifying by a custom remote audio endpoint enumerator the virtual display-port audio playback device to create.

3. The method of claim 1, wherein the virtual display-port audio playback device corresponds to a display-port monitor.

4. The method of claim 1, wherein the virtual display-port audio playback device comprises two or more virtual display-port audio playback devices and wherein each of the two or more virtual display-port audio playback devices is associated with the server application.

5. The method of claim 1, wherein the virtual display-port audio playback device comprises two or more virtual display-port audio playback devices and wherein each of the two or more virtual display-port audio playback devices is associated with a different server application.

6. The method of claim 1, wherein the selecting comprises communicating with one or more core audio application programming interfaces of the server and one or more high-level application programming interfaces of the server.

7. The method of claim 6, wherein the one or more core audio application programming interfaces communicate with the virtual display-port audio playback device via a custom remote endpoint enumerator.

8. One or more computer-readable non-transitory storage media embodying software that is operable when executed to:
receive, at a server, a notification from a client to create a virtual display-port audio playback device associated with a display-port audio playback device of the client;
in response to the notification, create, at the server, the virtual display-port audio playback device based, at least in part, on one or more parameters of the associated display-port audio playback device received from the client;
associate a server application with the virtual display-port audio playback device such that any requests from the server application will only be played back at the associated virtual display-port audio playback device;
receive a request from the server application to select the associated virtual display-port audio playback device;
in response to the request, select the virtual display-port audio playback device associated with the server application;
compress audio data associated with the received request by the selected virtual display-port audio playback device; and
send the compressed audio data directly to the display-port audio playback device that corresponds to the selected virtual display-port audio playback device such that the audio data is compressed in a format supported by the display-port audio playback device.

9. The media of claim 8, wherein the software when executed is further operable to:
identify by a custom remote audio endpoint enumerator the virtual display-port audio playback device to create.

10. The media of claim 8, wherein the virtual display-port audio playback device corresponds to a display-port monitor.

11. The media of claim 8, wherein the virtual display-port audio playback device comprises two or more virtual display-port audio playback devices and wherein each of the two or more virtual display-port audio playback devices is associated with the server application.

12. The media of claim 8, wherein the virtual display-port audio playback device comprises two or more virtual display-port audio playback devices and wherein each of the two or more virtual display-port audio playback devices is associated with a different server application.

13. The media of claim 8, wherein operable when executed to select comprises communicating with one or more core audio application programming interfaces of the server and one or more high-level application programming interfaces of the server.

14. The media of claim 13, wherein the one or more core audio application programming interfaces communicate with the virtual display-port audio playback device via a custom remote endpoint enumerator.

15. A system comprising:
one or more processors, and
a memory coupled to the processors comprising instructions executable by the processors, the processors being operable when executing the instructions to:
receive, at a server, a notification from a client to create a virtual display-port audio playback device associated with a display-port audio playback device of the client;
in response to the notification, create, at the server, the virtual display-port audio playback device based, at least in part, on one or more parameters of the associated display-port audio playback device received from the client;
associate a server application with the virtual display-port audio playback device such that any requests from the server application will only be played back at the associated virtual display-port audio playback device;
receive a request from the server application to select the associated virtual display-port audio playback device;
in response to the request, select the virtual display-port audio playback device associated with the server application;
compress audio data associated with the received request by the selected virtual display-port audio playback device; and
send the compressed audio data directly to the display-port audio playback device that corresponds to the selected virtual display-port audio playback device such that the audio data is compressed in a format supported by the display-port audio playback device.

16. The system of claim 15, wherein the processors are further operable when executing instructions to:
identify by a custom remote audio endpoint enumerator the virtual display-port audio playback device to create.

17. The system of claim 15, wherein the virtual display-port audio playback device corresponds to a display-port monitor.

18. The system of claim 15, wherein the virtual display-port audio playback device comprises two or more virtual display-port audio playback devices and wherein each of the two or more virtual display-port audio playback devices is associated with the server application.

19. The system of claim 15, wherein the virtual display-port audio playback device comprises two or more virtual display-port audio playback devices and wherein each of the two or more virtual display-port audio playback devices is associated with a different server application.

20. The system of claim 15, wherein when executing instructions to select comprises communicating with one or more core audio application programming interfaces of the server and one or more high-level application programming interfaces of the server, and wherein the one or more core audio application programming interfaces communicate with the virtual display-port audio playback device via a custom remote endpoint enumerator.

21. The system of claim 20, wherein the one or more core audio application programming interfaces communicate with the virtual display-port audio playback device via a custom remote endpoint enumerator.

* * * * *